Feb. 18, 1930.　　　　H. ARMSTRONG　　　　1,747,412
TRACTOR ATTACHMENT FOR AUTOMOBILES
Filed June 11, 1928
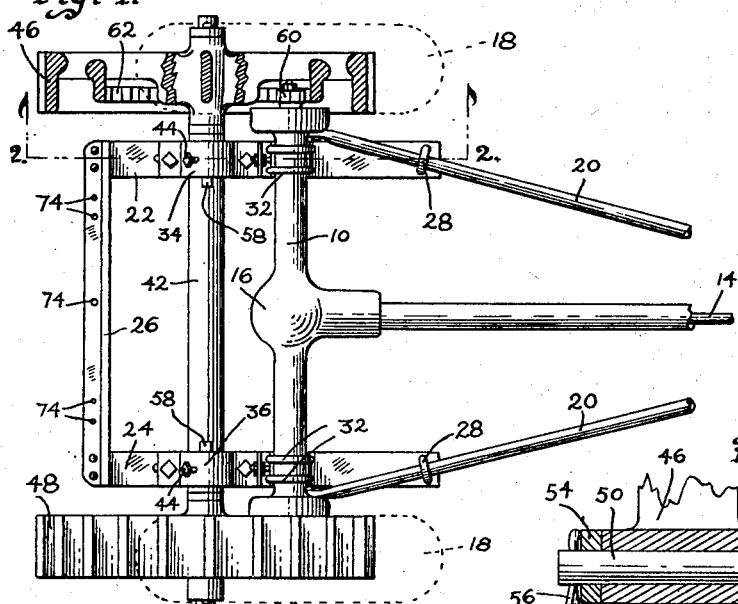
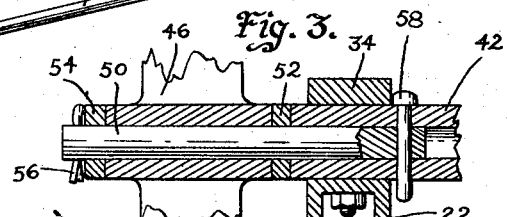
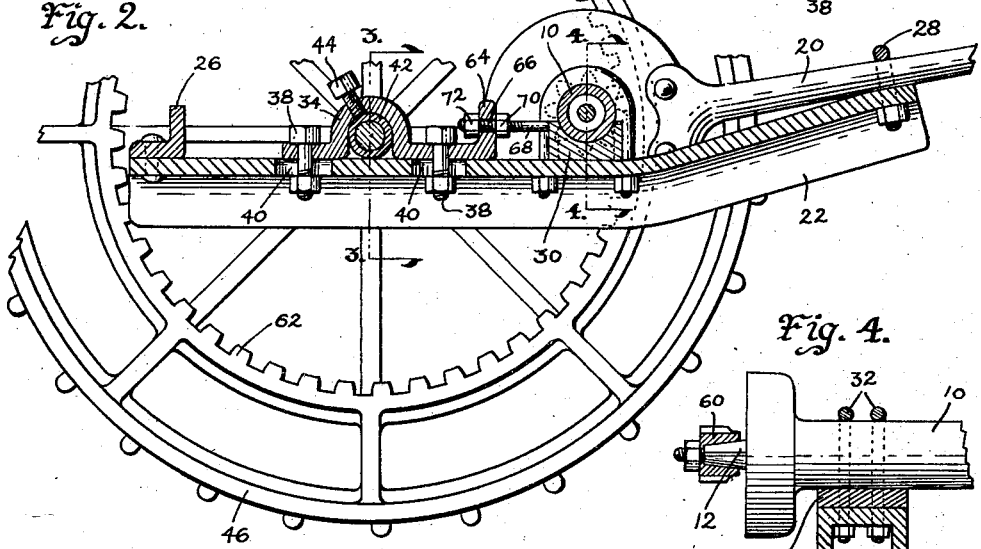
Inventor
Hugh Armstrong
by Bair, Freeman & Sinclair
Attorneys
Witness
Solomon
Betensky Patented Feb. 18, 1930

1,747,412

UNITED STATES PATENT OFFICE

HUGH ARMSTRONG, OF MARYVILLE, MISSOURI

TRACTOR ATTACHMENT FOR AUTOMOBILES

Application filed June 11, 1928. Serial No. 284,420.

The object of this invention is to provide an improved mechanism whereby an automobile may be quickly and easily transformed into a tractor.

A further object of this invention is to provide an improved attachment for Ford automobiles, whereby the rear or traction wheels of the automobile may be removed and slow speed traction wheels substituted therefor to effectively transform the vehicle into a tractor or slow speed vehicle having increased power for draft purposes.

Still another object of this invention is to provide a device of the character described, which is simple and economical of construction and is capable of being attached or removed with a minimum of labor and in a very short time and which is so arranged as to be convenient for applying draft to a follower vehicle or machine for various purposes.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a plan view partly in section illustrating my improved attachment applied to the rear end portion of the chassis of an automobile.

Fig. 2 is a longitudinal section on an enlarged scale on the line 2—2 of Fig. 1.

Fig. 3 is a detail vertical section on the line 3—3 of Fig. 2 and illustrating particularly, the method of attaching the tractor wheels to the auxiliary frame.

Fig. 4 is a detail vertical section on the line 4—4 of Fig. 2 and illustrating particularly, the method of attaching the auxiliary frame to the rear axle of the vehicle and also showing how the driving pinions are substituted for the regular traction wheels of the vehicle.

My improved attachment is particularly designed for Ford automobiles and is so constructed and arranged that it may be very quickly and easily applied and removed, whereby the automobile may be rapidly transformed into a vehicle having the characteristics of a tractor. Through the use of this attachment, an automobile of the kind set forth may be employed for traveling from place to place and then be readily transformed into a tractor for doing work at various spaced locations.

Thus, the one vehicle is caused to do and perform the functions of both a road vehicle and a tractor and the time and labor of the operator is conserved.

In the accompanying drawings, which illustrate one embodiment of my invention, I have shown only enough of the chassis of a Ford automobile to illustrate the application of the attachment.

I have employed the numeral 10 to designate the tubular rear axle housing of the automobile, in which axle are mounted spindles 12, adapted to be driven by a drive shaft 14 through a differential mechanism located in a housing 16. Normally, the spindles 12 carry the rear or traction wheels of the automobile which I have indicated by dotted lines in Fig. 1 and designated by the numerals 18. The automobile construction also includes rear radius rods 20 which extend forwardly on converging lines from points near the ends of the rear axle housing 10.

My attachment includes an auxiliary frame composed of channeled side beams 22 and 24, which are rigidly connected at their rear ends by an angle cross bar 26.

The side beams 22 and 24 are arranged with their flanges downwardly and said beams extend tranversely of and beneath end portions of the rear axle housing 10. The forward end portions of the side beams 22 and 24 are bent upwardly somewhat so as to come in contact with the respective radius rods 20 to which they are clamped by means of U bolts 28.

Mounted on the side beams 22 and 24 are blocks 30, each of which is formed with a concaved upper face to receive the tubular axle housing 10. The beams 22 and 24 are clamped to the end portions of the axle housing 10 by means of U bolts 32, in this instance two at each end, which U bolts embrace the axle housing and the blocks 30 and bind the parts rigidly together.

Mounted on the rear end portions of the side beams 22 and 24 respectively, are clamp members 34 and 36 and said clamp members are adjustably secured to said beams by means of bolts 38, which extend through said clamp members and through longitudinal slots 40 (Fig. 2) in said beams.

An auxiliary axle housing or elongated tubular bearing 42 is arranged parallel with and at the rear of the main axle housing 10 and said auxiliary bearing extends across the side beams 22 and 24 and through the clamp members 34 and 36 and is held rigidly therein by means of set screws 44.

Auxiliary traction wheels are provided and are designated by the numerals 46 and 48 and said wheels may be of any approved type suitable for a vehicle having the characteristics of a tractor.

Each of the auxiliary traction wheels 46 and 48 is rotatably mounted on a spindle or stub axle member 50. The traction wheels 46 and 48 are mounted on their spindles 50 between washers 52 and 54 and held in place by any suitable means such as cotter keys 56.

The spindles 50 are designed to be removably and replaceably mounted in the end portions of the auxiliary axle or bearing 42 and held therein by means of pins or bolts 58 passing through registering apertures and preferably located adjacent the inner faces of the respective side beams 34 and 36.

When it is desired to transform a vehicle into a tractor, the regular rear wheels 18 are removed from the spindles 12 and pinions 60 are substituted therefor, which are designed to mesh with and drive internal gears 62 formed on the auxiliary traction wheels 46 and 48.

The auxiliary wheels 46 and 48 are placed in position by inserting their stub axles 50 within the end portions of the auxiliary tubular bearing 42 and inserting the pins or bolts 58 to hold them in place.

In order to insure that the pinions 60 shall mesh properly with the internal gears 62, the clamp members 34 and 36 are adjustable on the side beams 22 and 24, thereby permitting an adjustment of the spacing of the auxiliary tubular bearing 42 relative to the main axle housing 10.

To accomplish this adjustment, I have provided the clamping members 34 and 36 with upturned flanges 64 at their forward ends, each of which flanges is formed with an aperture 66 therethrough.

A stud bolt 68 is loosely mounted through each of the apertures 66 and has its forward end portion bearing against one of the blocks 30 carried by the side beams of the auxiliary frame. The rear end portions of the stud bolts 68 are threaded and lock nuts 70 and 72 are mounted thereon on opposite sides of the flanges 64. By adjusting the lock nuts 70 and 72, the positions of the clamping members and the parts carried thereby may be adjusted to bring the pinions 60 into accurate mesh with the internal gears 62.

It will be noted that an automobile of the kind described may be permanently equipped with the auxiliary frame including the auxiliary tubular bearing 42.

When so equipped, the vehicle can be readily transformed into a tractor by removing its rear wheels, as above stated and applying the auxiliary traction wheels 46 and 48 and the pinions 60 meshing therewith. This operation can be performed in a very few minutes by jacking up the rear end of the vehicle.

It will thus be observed that I have provided convenient means for quickly and easily transforming a road vehicle into a tractor and vice versa, by means of inexpensive and efficient equipment.

The cross bar 26 at the rear of the auxiliary frame may be employed for making connections to a vehicle or implement to be drawn by the tractor and for this purpose I have shown said cross beams as formed with a plurality of apertures 74, spaced through its length to receive attachment of suitable draft means, not shown.

It will be noted that the draft means may thus be so located relative to the rear wheels of the tractor that the follower vehicle may be staggered relative to the path of travel of the tractor without danger of the draft means coming into contact with said wheels, since the cross bar 26 is located near the rear points of the wheels.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. An attachment of the character described, comprising a frame formed of parallel side beams and a cross bar rigidly connecting their rear ends, said beams extending across the rear axle of a vehicle and into contact with the rear radius rods thereof, U bolts for clamping the forward ends of said beams to said radius rods, other U bolts for clamping intermediate parts of said beams to the vehicle axle, a tubular bearing member secured transversely of said frame at the rear of the rear vehicle axle, spindles removably mounted in end portions of said tubular bearing member, traction wheels rotatably mounted on said spindles, each of said traction wheels being formed with an internal gear, and a pinion carried at each end of the driving axle of the vehicle and adapted to mesh with the internal gear of one of said traction wheels.

2. An attachment of the character described, comprising a frame formed of a pair of side beams arranged parallel with each other, a cross bar rigidly connecting the rear ends of said side beams, said side beams extending across and beneath the rear axle of a vehicle, clamping members for securing said side beams to said axle, the forward ends of said side beams extending beneath the rear radius rods of the vehicle, clamping members for securing said side beams to said radius rods, a tubular axle member mounted on said side beams at the rear of the vehicle axle, clamping members for securing said axle member to said side beams, traction wheels carried at the ends of said axle member, and gear connections between said traction wheels and the driving axle of the vehicle.

Des Moines, Iowa, May 31, 1928.

HUGH ARMSTRONG.